US005480497A

United States Patent [19]
Zaluzec et al.

[11] Patent Number: 5,480,497
[45] Date of Patent: Jan. 2, 1996

[54] HIGH SPEED ELECTRICAL DISCHARGE SURFACE PREPARATION INTERNAL SURFACES FOR THERMAL COATINGS

[75] Inventors: Matthew J. Zaluzec, Canton; Oludele O. Popoola, Ann Arbor; Larry Reatherford, Clarkston; Thomas W. Rose, West Bloomfield, all of Mich.

[73] Assignee: Ford Motor Company, Dearborn, Mich.

[21] Appl. No.: 314,015

[22] Filed: Sep. 28, 1994

[51] Int. Cl.⁶ .................................................. B23H 7/00
[52] U.S. Cl. ................................. 148/512; 204/129.1
[58] Field of Search ......................... 148/512; 204/129.1

[56] References Cited

U.S. PATENT DOCUMENTS

| | | |
|---|---|---|
| 3,451,871 | 5/1965 | Bauer et al. |
| 4,219,718 | 8/1980 | Sato et al. |
| 4,488,882 | 12/1984 | Dausinger et al. |
| 4,675,204 | 6/1987 | Nicoll et al. |
| 5,268,045 | 12/1993 | Clare ....................... 148/518 |

FOREIGN PATENT DOCUMENTS

| | | |
|---|---|---|
| 1293515 | 4/1969 | Germany. |
| 1687629 | 10/1991 | U.S.S.R.. |

*Primary Examiner*—Melvyn Andrews
*Attorney, Agent, or Firm*—Joseph W. Malleck; Roger L. May

[57] ABSTRACT

A method of preparing metal surfaces for thermally applied coatings by electrical discharge, which method controllably provides greater roughness for increased mechanical coating adhesion, avoids carbon deposits and is more economical to use. The method comprises melting and rapidly solidifying globules of the metal surface by spark erosion, the spark erosion occurring by incidence of an electrical discharge between an electrode and the metal surface closely spaced thereto, the spacing having an electrolyte with plasma forming capabilities, the discharge resulting from application of an electrical current to the electrode with a DC voltage in the range of 60–85 volts and amperage in the range of 50–110 amps, the current being pulsed on for periods of 150–300 micro seconds per spark.

7 Claims, 4 Drawing Sheets

HIGH SPEED ELECTRICAL DISCHARGE SURFACE PREPARATION INTERNAL SURFACES FOR THERMAL COATINGS

BACKGROUND OF THE INVENTION

1. Technical Field

This invention relates to the technology of surface preparation of metal surfaces for wear resistant and high temperature thermal spray coatings, and more particularly to electrical discharge sparking for preparing such surfaces.

2. Discussion of the Prior Art

The prior art has essentially used three types of techniques for preparing surfaces for thermally applied coatings, namely, grit blasting, water jetting, and high frequency magnetic field agitation. Surface preparation, prior to coating deposition, is necessary to ensure adequate coating adhesion; this occurs principally through a mechanical interlocking when the molten spray coating impacts the surface, solidifies and conforms to the surface topography of the component being coated.

Grit blasting requires that the fluidized supply of grit particles be impacted against the target surface with fluid pressures which are relatively high, greater than 50 psi. The grit mediums for such surface preparation usually consist of silica sand, aluminum oxide, chilled iron or garnet particles to produce the roughened surface. Unfortunately, with grit blasting the surface must be cleaned of any foreign surface contaminants, residual grit and dust before the thermal spray coating is applied. Moreover, grit blasting is not suitable for high-volume on-line manufacturing of thermal spray coated components for several reasons: (i) grit contamination of components and process equipment is a problem in high volume manufacturing environments, (ii) on-line collection and containment of the grit medium is difficult, it is not an environmentally clean process, (iii) the techniques for grit blasted surfaces do not allow for accurate dimensional control, (iv) grit blasting is a line of sight process making surface preparation of complex components extremely difficult, with poor reproducibility.

Water jetting has been utilized to clean cylinder wall surfaces of an aluminum engine block by a blast of high pressure water. The water is directed against the cylinder wall surface by a rotating water spray nozzle axis which is lowered and raised along the axis of each cylinder. The disadvantage of water jetting is that it abrades small shallow pits in non-ferrous metals, such as cast aluminum alloy, roughening only to a degree of about 50 micro meters. The cost for water jetting is extremely high and requires expensive high pressure water pumps.

High frequency electric current agitation has been applied to metal, particularly sheets, at extremely high levels between 50,000 and 600,000 volts at a frequency between 25–400 Hz to clean and activate the metal surface for improving the adherence of inks, paints and plastics. The process is more akin to ultrasonic cleaning in that it disrupts the tenacious native oxide layer on the surface of metals to allow a better coating adhesion, but does not erode or affect the metal surface itself.

Electrical discharge devices have been used heretofore to machine or cut metal surfaces to produce as smooth or satin-like surface as can be obtained. High voltages at low amperages for considerably long "on" periods have been used to produce a cut surface changed little in hardness. The technique simply removes metal from the work surface in a smooth, satin-like manner.

SUMMARY OF THE INVENTION

It is an object of this invention to provide an improved method of preparing metal surfaces for thermal spray coatings by electrical discharge, which method controllably provides greater roughness for increased mechanical coating adhesion, avoids carbon deposits in the case of water dielectric fluids, and is more economical to use.

The method of this invention for preparing a metal surface to receive thermal spray coatings that meets such object, comprises: melting and rapidly solidifying globules of the metal surface by spark erosion, the spark erosion occurring by incidence of an electrical discharge between an electrode and the metal surface closely spaced thereto, the spacing having an electrolyte with plasma forming capabilities, the discharge resulting from application of an electrical current to the electrode with a D.C. voltage in the range of 60–85 volts and amperage in the range of 50–110 amps, the current being pulsed on for periods of 150–300 micro seconds per spark.

DETAILED DESCRIPTION IN BEST MODE

Figure 1:
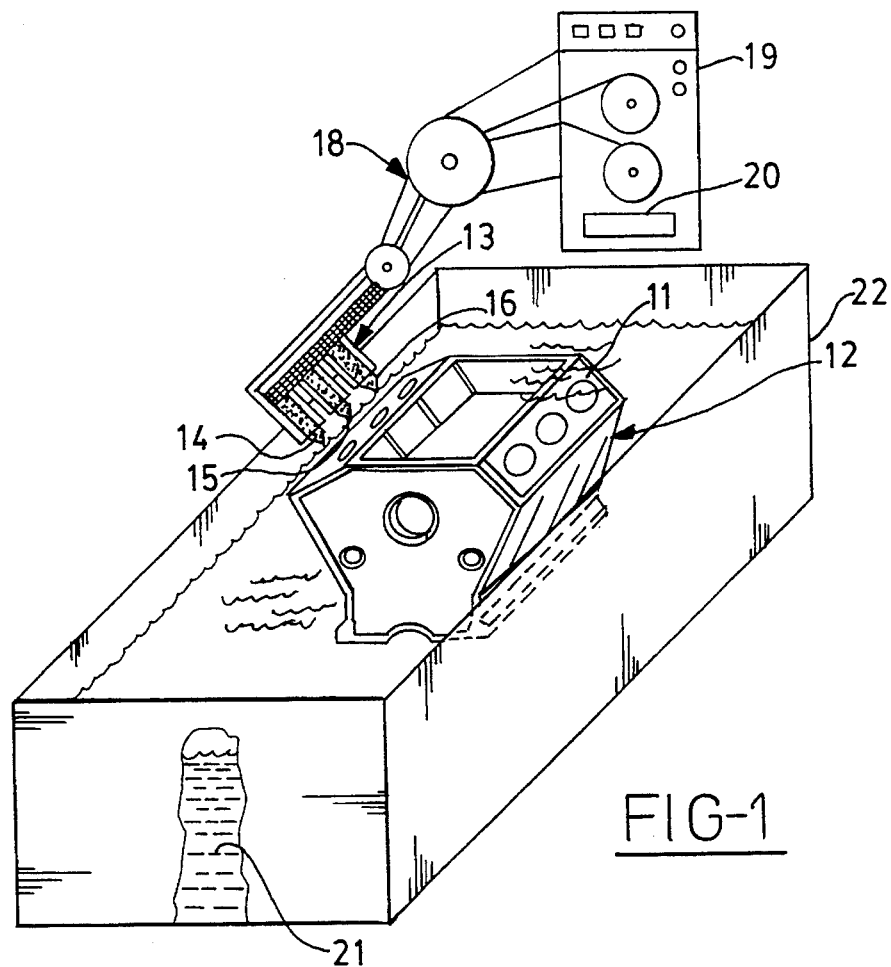
FIG. 1 is a schematic perspective view of an electrical discharge sparking machine (embodying the principles of this invention) for roughening the internal bore surfaces of an aluminum engine block.
Figure 2:
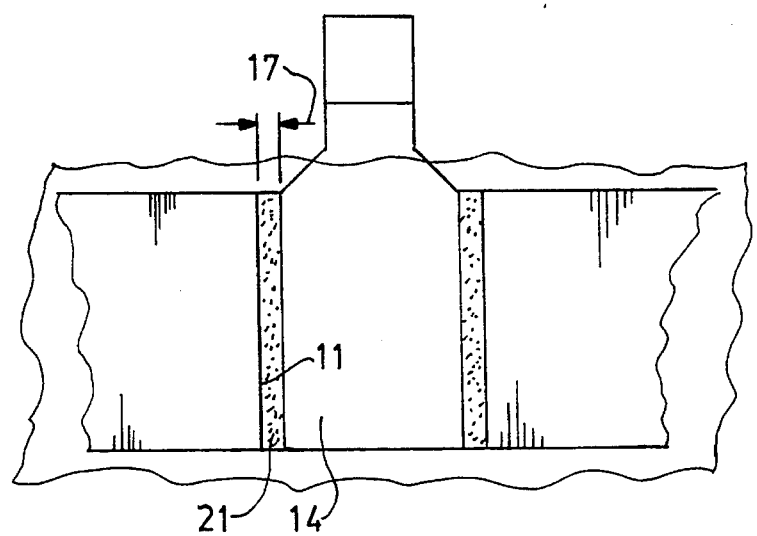
FIG. 2 is an enlarged sectional view of a portion of a cylinder bore of such engine block, showing the sparking electrode in place.

As shown in FIGS. 1 and 2, the electrical discharge roughening method of this invention can be used to prepare the internal cylinder surfaces of bores 11 of an aluminum engine block 12. The same technology can be used to prepare other light weight metal components, i.e. magnesium and aluminum, prior to coating deposition. A bank 13 of 3 electrodes (14, 15, 16) shaped complimentary to the bores 11, except for a circumferential spacing 17 therebetween of about 40 micrometers. The bank of electrodes 13 is carried or manipulated on a robot arm 18 controlled from a panel 19. A suitable power supply 20 in the panel feeds electrical current to the bank 13 of electrodes according to a programmed scheme. Electrolyte medium 21 fills the circumferential gap existing between the electrodes and the metal wall of each bore 11 to be eroded; the electrolyte is introduced into such gap when the electrodes and block are immersed in tank 22.

The necessary components for an electrical discharge to occur across a spark gap, for purposes of this method, requires applications of a DC voltage to a cathode barrel electrode 13, making the block 12 an anode immersed in a dielectric fluid of deionized water with a typical conductivity of about 15 micro-siemens; the deionized water contains ultra fine solid impurities, such as cations of hydrogen, sodium, calcium, magnesium, aluminum, iron, and anions such as hydroxides, chlorides, bicarbonates, carbonates, sulfates, nitrates and phosphates.

Figures 3A, 3B, 3C, 3D:
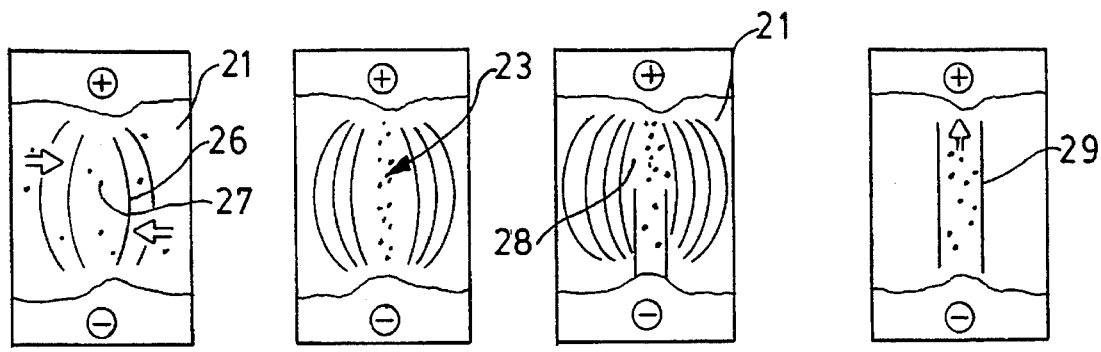
FIGS. 3A–3H are a series of schematic conceptual views of the physical phenomenon of spark erosion according to this invention.
Figures 3E, 3F, 3G, 3H:
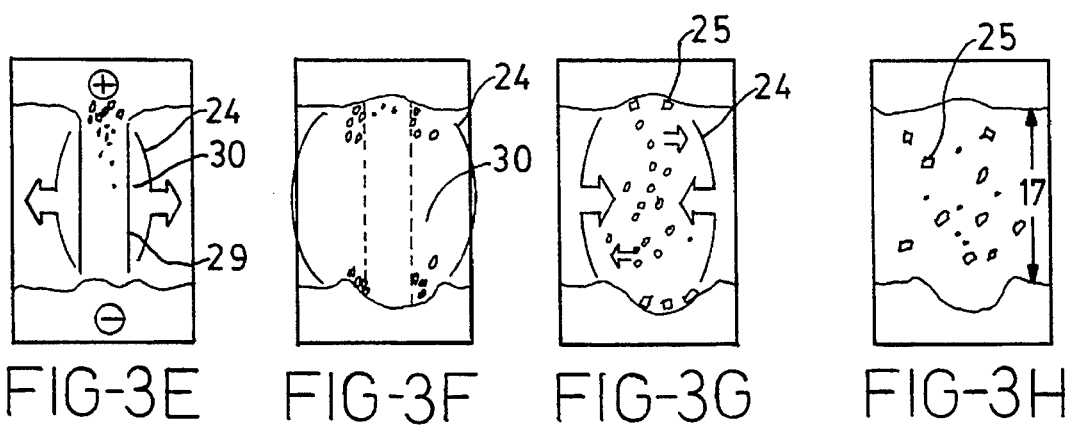

Turning to FIGS. 3A–3H, there is at first no electric current flowing between the anodic cylindrical surface of the cylinder bore 11 and the cathodic electrode 13 because they are insulated by the water dielectric 21. Within a few microseconds, the electric field 26 causes the micron impurity particles 27 to be suspended (FIG. 3A) and form a bridge 23 across the gap (FIG. 3B), which then results in the breakdown of the dielectric at 28 (FIG. 3C). The voltage will fall to a lower level and the current will increase to a constant value by the operator. Due to the emission of negative particles (spark discharge), the plasma channel 29 grows during the pulse "on" time (FIG. 3D). A vapor bubble 24 will then form around the plasma channel 29 (FIG. 3E) and the surrounding dense water 30 dielectric, restricts the plasma growth (FIG. 3F), concentrating the input energy to a very small volume. The plasma temperatures will reach to very high levels such as 40,000 k and the plasma pressure can rise to as much as 3 k bar. There will be an explosion-like melting-reshaping of metal globules at a reduced heat input after drop in current. As the current flow halts, the bubble 24 implodes (FIG. 3G) thereby distorting the molten globules 25 (FIG. 3H) without freeing them into the gap 17. The dielectric fluid solidifies this molten material (metal particles, carbon and gas) by its temperature differential before such material can be carried away. The cycle is then repeated during a subsequent on time.

Figure 4:
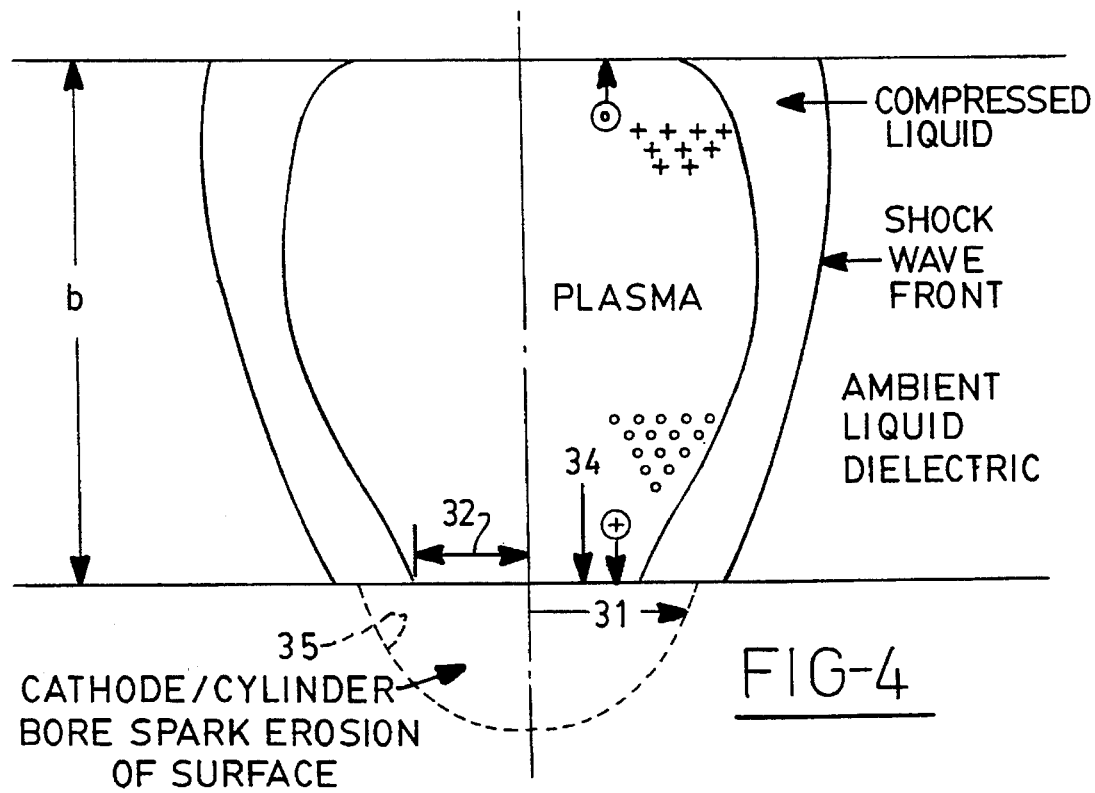
FIG. 4 is a highly enlarged schematic of the physical phenomenon of spark discharge roughening.

Because of bombardment by fast moving electrons at the start of the pulse, the surface to be roughened has globules of radius 31 (see FIG. 4) which will melt rapidly first but then begin to resolidify after a few microseconds. This is believed to be due to the expansion of the plasma radius 32 at the surface to be roughened, causing a decrease in the local heat flux 34 at the work surface. It is important to realize that no machining takes place, that is, metal material is not taken away, only dislodged and reformed. The high speed electrical discharge roughening process herein creates a modified dimpled surface 35 structured by melting and rapidly solidifying globules 25 of the metal surface during the spark erosion time. To achieve this, the electrical discharge must be run at very low voltages (approximately 60 to 85 volts) with current amperage at a high level (50 to 110 amps) and relatively long on-off spark erosion times (on the order of 150–300 microseconds per spark).

Figure 5:
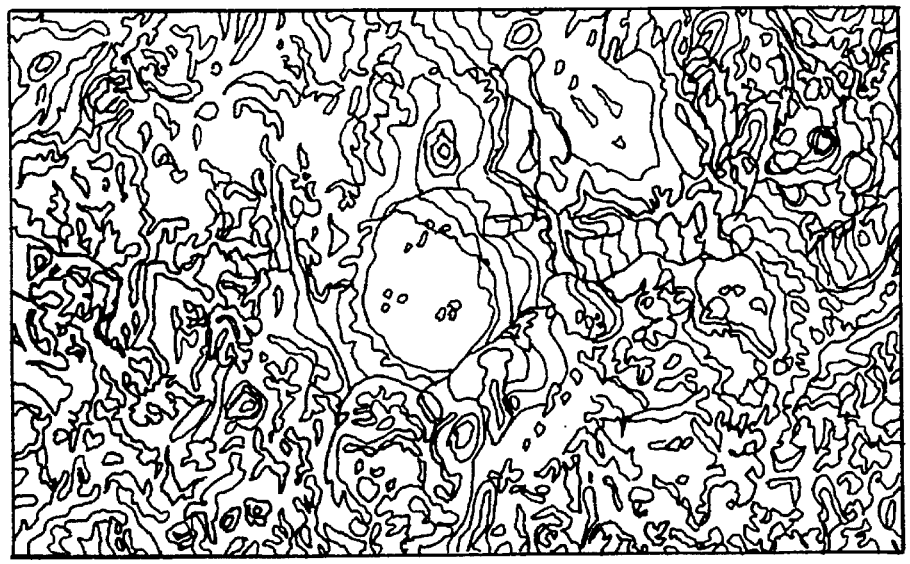
FIGS. 7 and 5 are comparative simulations of scanning electron micrographs of roughened aluminum metal bore surfaces, FIG. 7 being for a grit blasted surface and FIG. 5 for an electrical discharge roughened surface according to this invention.
Figure 6:
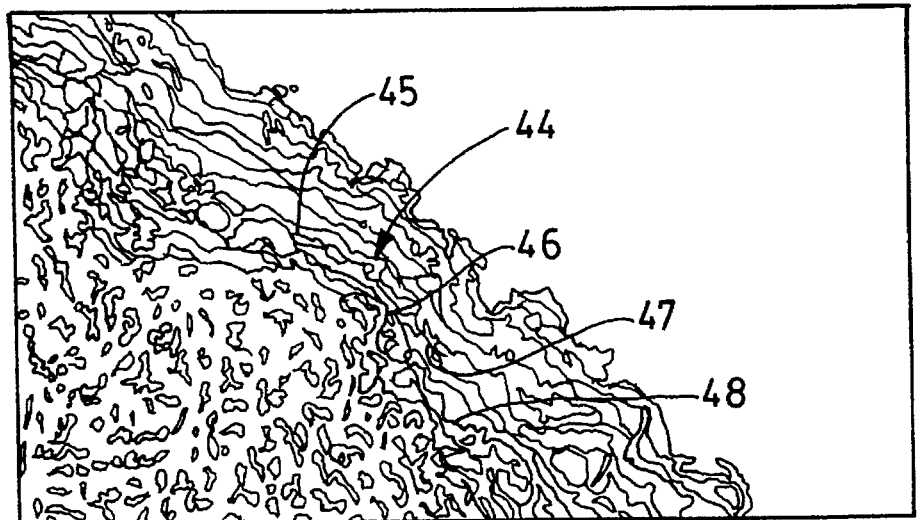
FIGS. 8 and 6 are comparative cross sections scanning electron micrographs of the above surfaces demonstrating thermal spray coating adhesion to roughened surfaces.
Figure 7:
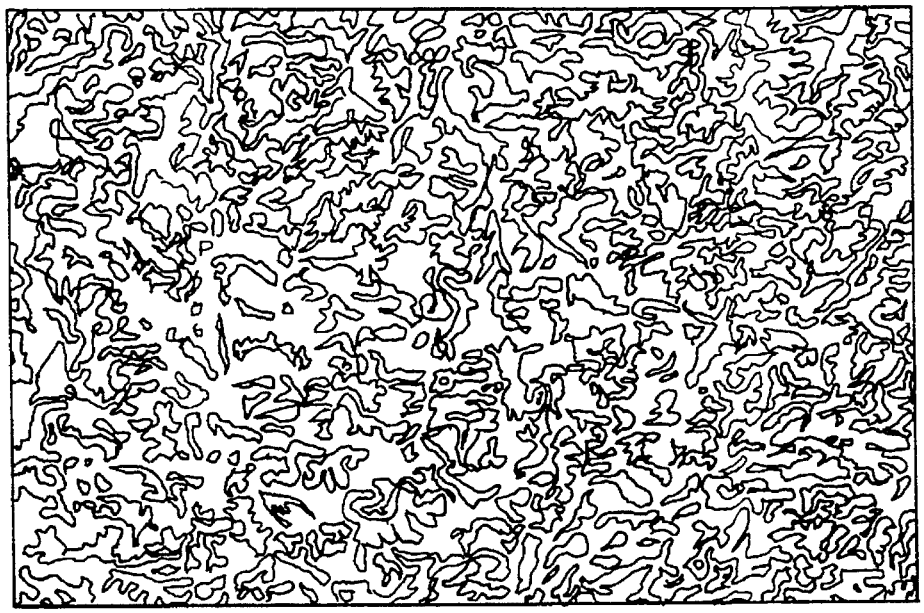
Figure 8:
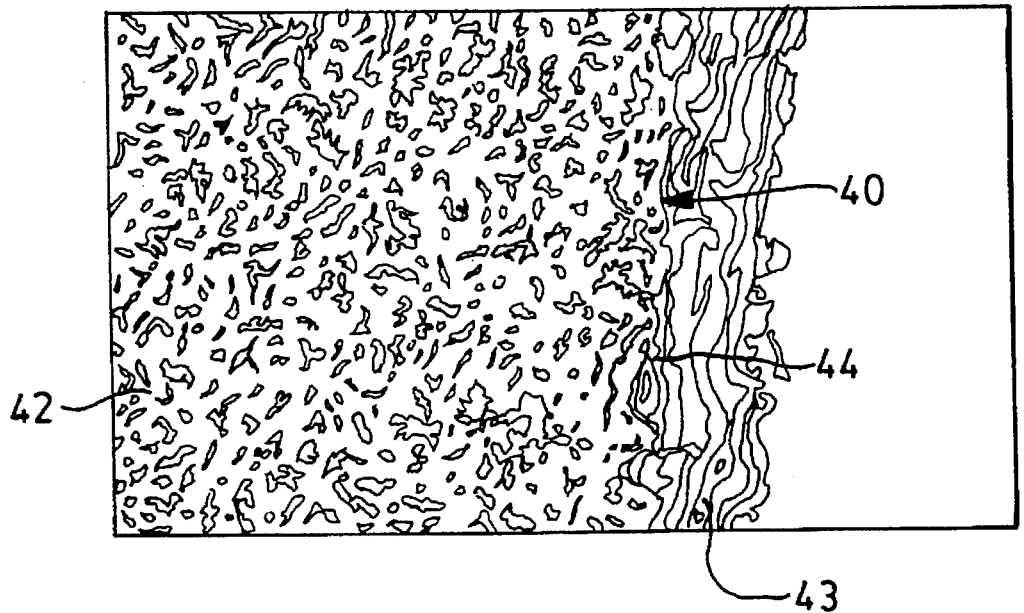

FIGS. 5–6 illustrate the topography of an aluminum cylinder bore (319 A1) roughened by electrical discharge. FIGS. 7–8 illustrate an aluminum cylinder bore (319 A1) that has been roughened by use of iron grit blasting.

Comparing uncoated sections of the two differently prepared surfaces (FIGS. 5 and 7) shows a smeared smooth metal surface of the grit blasted surface (FIG. 7 (25× magnification)) and the irregular contours of the electrical discharge roughened surface (FIG. 5). The surface topography of FIG. 8 (55× magnification) shows grit blasting creates a relatively smooth surface 40; such smoothness is apparent from the gradual undulations 41 in the surface of the aluminum bore 42 which fail to lock the thermal spray coating 43 applied thereover. There is no undercuts or jaggedness about the grit blasted surface 40. As shown in FIG. 6, electrical spark erosions creates a non-uniform surface topography of the surface 44 of bore 49; the contours 45 of the surface have greater spacing and the jagged peaks 46, undercuts 47 and overlapped reliefs 48 are quite apparent.

The irregular re-entrant surface topography of the spark eroded surface of this invention is ideally suited for thermal spray coating adhesion. For example, the surface adhesion results obtained in a coating bond pull test showed the following. The EDM prepared surface averaged about 2750 psi with a surface roughness of about 17.8 micrometers (Ra). Grit blasted surfaces have an average coating bond strength of about 2200 psi and a surface roughness of about 12.4 micrometers (Ra). Thus the method of this invention produces a surface roughness comparable to or better than that obtained by conventional grit blasting and thus enhances coating/substrate mechanical interlocking.

The method has also demonstrated that electrical discharge roughening produces a chemically modified surface layer particularly for aluminum alloys containing silicon. Silicon is redistributed as observed in the surfaces of the bore. This modified layer prevents the formation of coating/substrate interfacial microcracks. In addition, it has been noticed that the surface layer after modification by the electron discharge roughening, is harder than the bulk substrate metal but generally softer than most thermal spray metal coatings. This graded hardness produces a favorable stress distribution at the coating/substrate interface. For example, the bulk aluminum 319 substrate hardness is about 44.5, while the surface layer of the electrical discharge roughened surface is about 70, and the thermal spray coating itself will have a hardness level of about 198 or greater. These hardness numbers were obtained in a comparative HK (Knoop) hardness test (25 g load).

We claim:

1. A method of preparing metal surfaces for receiving thermal sprayed coatings, comprising:

melting and rapidly solidifying globules of said metal surface by spark erosion, said spark erosion occurring by incidence of an electrical discharge between an electrode and the metal surface closely spaced thereto, the spacing containing an electrolyte with plasma forming capabilities, said discharge resulting from application of an electrical current to said electrode having a DC voltage in the range of 60–85 volts and an amperage of 50–110 amps, said current being pulsed on for periods of 150–300 microseconds per spark.

2. The method as in claim 1, in which said electrode is moved systematically across said surface to effect a continuous roughening of said surface.

3. The method as in claim 1, in which said surface is an aluminum based material.

4. The method as in claim 1, in which said surface is an internal cylindrical bore of an engine block comprised of an aluminum silicon alloy.

5. The method as in claim 1, in which said solidification of said globules occurs rapidly within a time period of 1 microsecond after melting.

6. The method as in claim 1, in which said surface is spaced closely to said electrode by a gap of about 40 micro meters.

7. The method as in claim 1, in which said electrolyte is deionized water containing some impurities.

* * * * *